United States Patent [19]
Crum et al.

[11] Patent Number: 5,649,573
[45] Date of Patent: Jul. 22, 1997

[54] APPARATUS FOR COLLECTING LIQUIFIED MATTER FROM A SOURCE OF LIQUIFIED MATTER

[76] Inventors: Bradley M. Crum, R.R. #1, Box 187 A, Frankfurt, Ind. 46041; Macolynn D. Gray, Route #1, Box 307, Cutler, Ind. 46920

[21] Appl. No.: 420,671

[22] Filed: Apr. 12, 1995

[51] Int. Cl.$^6$ ............................................. B65D 1/04
[52] U.S. Cl. ........................ 141/67; 141/65; 141/231; 141/387; 414/467; 137/205
[58] Field of Search ................... 141/65, 67, 231, 141/312, 332, 337, 382, 387, 388; 414/349, 373, 523, 527, 467, 539; 406/39, 113, 115, 151, 152, 153; 239/651; 137/205, 615

[56] References Cited

U.S. PATENT DOCUMENTS

| | | | |
|---|---|---|---|
| 3,687,311 | 8/1972 | Nesseth | 214/16 R |
| 4,289,439 | 9/1981 | Hansson | 414/523 |
| 4,439,115 | 3/1984 | Nesseth et al. | 414/460 |
| 4,661,046 | 4/1987 | Ruyle | 417/203 |
| 5,141,528 | 8/1992 | Boczkiewicz | 55/1 |
| 5,297,745 | 3/1994 | Vinyard | 241/101.7 |
| 5,330,332 | 7/1994 | Nesseth et al. | 417/440 |

*Primary Examiner*—Henry J. Recla
*Assistant Examiner*—Steven O. Douglas
*Attorney, Agent, or Firm*—Woodard, Emhardt, Naughton, Moriarty & McNett

[57] ABSTRACT

An apparatus for cooperative arrangement with a vacuum vehicle and a source of vacuum-transportable matter is provided for collecting vacuum-transportable matter within a matter collection chamber of the vehicle. The apparatus includes a vacuum hose connected at one end to the matter collection chamber and a hollow probe having an outlet connected at an opposite end. A pivoting structure is connected between the vehicle and the probe and is hydraulically and electrically controllable from the within the cab of the vehicle to thereby guide the probe. An extraction funnel is fluidly connected to the source of vacuum-transportable matter and is configured to be sealingly engageable with the probe outlet. The probe is guided from the cab of the vehicle into sealing engagement with the extraction funnel so that vacuum-transportable matter may flow from the source of vacuum-transportable matter into the matter collection chamber under the presence of vacuum generated therein.

13 Claims, 5 Drawing Sheets

APPARATUS FOR COLLECTING LIQUIFIED MATTER FROM A SOURCE OF LIQUIFIED MATTER

FIELD OF THE INVENTION

The present invention relates generally to apparata for extracting vacuum-transportable matter from a source of vacuum-transportable matter and transferring the matter to a matter collection container, and more specifically to such apparata for extracting liquified manure from a manure confinement location and transferring the manure to a collection vehicle such as a manure spreader.

BACKGROUND OF THE INVENTION

It is common practice in farming to collect animal manure in confinement locations for subsequent use as fertilizer. In fact, several prior art systems are known for transferring manure from an animal confinement location to a manure storage location for interim storage of the manure prior to its use as fertilizer. Examples of such systems are disclosed in U.S. Pat. Nos. 3,687,311, 4,439,115 and 5,330,332 to Nesseth et al. Regardless of the storage location, however, the manure must, at some point, be somehow transferred from the storage location to a manure distribution mechanism such as a manure spreading vehicle.

Manure collection vehicles are also known and exist in many forms. For example, U.S. Pat. No. 5,297,745 to Vinyard discloses an automated apparatus for cooperative arrangement with a tractor or similar vehicle for collecting loose manure from the surface of an animal confinement area such as a feedlot. As another example, U.S. Pat. No. 4,289,439 to Hansson discloses an auger-type manure collection apparatus carried by a vehicle which is rotatable outwardly from the vehicle to collect loose manure from accessible areas beneath animal confinement cages. Finally, U.S. Pat. No. 4,661,046 to Ruyle discloses an auger-type apparatus for cooperative arrangement with a vacuum wagon. When the auger apparatus is operatively inserted into the manure pit, the combined mechanical auger action and vacuum action supplied by the vacuum wagon transfers manure from the pit to the wagon.

Although the Ruyle apparatus, as well as other known apparata operably associated with a vacuum/suction-type vehicle, are effective in transferring manure from a manure confinement location to a vacuum vehicle, apparata of this type have several disadvantages associated therewith.

First, such apparata are laborious to operate. Either the vacuum vehicle operator is required to constantly enter and exit the vehicle to connect and disconnect the apparatus from the vehicle, or an additional laborer is required to provide this function. In either case, operation of such an apparatus is labor intensive.

Second, most prior art apparata are messy to operate as the apparatus is constantly connected and disconnected to the vacuum vehicle. Excess manure in the vacuum line usually ends up spilling on the transfer site and/or on the operator if great care is not taken to evacuate the vacuum line prior to the connect/disconnect procedure.

What is therefore needed is an apparatus to more efficiently and effectively transfer manure from a manure storage location to a vacuum vehicle. Ideally, such an apparatus should be semi-automated so that the vacuum vehicle operator may engage the apparatus from the cab area of the vehicle. Further, the apparatus should be self-evacuating to thereby avoid spillage at the transfer site. Finally, such an apparatus would be applicable, or easily modified, to a variety of liquified matter transfer arrangements.

SUMMARY OF THE INVENTION

The foregoing limitations and shortcomings of the prior art are addressed by the present invention. In accordance with one aspect of the present invention, an apparatus for extracting liquified matter from a source of liquified matter comprises an extraction port connected to the source of liquified matter, a hose having a first end connected to a liquified matter collection container and a second end sealingly engageable with the extraction port, and means remote from the second end of said tube for guiding the second end thereof into sealing engagement with the extraction port. The liquified matter flows from the source of liquified matter to the collection container when the second end of the hose is sealingly engaged with the extraction port.

According to another aspect of the present invention, an apparatus for transferring matter from a source of vacuum-transportable matter to a matter collection chamber of a vehicle, wherein the matter collection chamber has means associated therewith for selectively generating a vacuum therein, comprises a vacuum hose having a first end connected to the matter collection chamber of the vehicle and a second end and an extraction port connected to the source of vacuum-transportable matter. The extraction port is adapted for sealingly receiving the second end of the vacuum hose therein so that the vacuum generated in the matter storage chamber draws vacuum-transportable matter through the vacuum hose and into the matter collection chamber. Means remote from the second end of the vacuum hose are also provided for guiding the second end of the vacuum hose into the extraction port. The vacuum-transportable matter within the hose drains back into the source of vacuum-transportable matter when the vacuum is not generated within the matter collection chamber.

According to a further aspect of the present invention, a liquified matter collection vehicle, in combination with a source of liquified matter, comprises a collection chamber, means for generating a vacuum within the collection chamber, a hose having a first end connected to the collection chamber and a second end, and means remote from the second end of the hose for guiding the second end into sealing engagement with the source of liquified matter. The vacuum generated within the collection chamber draws liquified matter through the hose and into the collection chamber when the second end of the hose is sealingly engaged with the source of liquified matter.

One object of the present invention is to provide an apparatus for collecting liquified matter from a source of liquified matter wherein the apparatus is guidable from a remote location.

Another object of the present invention is to provide a hose operatively connected to a vacuum chamber and an extraction port connected to a source of vacuum-transportable matter, wherein the hose is remotely controllable to establish a sealing engagement with the extraction port so that vacuum-transportable matter is transferred to the vacuum chamber.

Yet another object of the present invention is to provide a vacuum hose operatively connected to a matter collection chamber of a vacuum vehicle and an extraction port fluidly connected to a source of liquified matter, wherein the hose is remotely controllable to establish a sealing engagement with the extraction port so that liquified matter flows from the source of liquified matter into the matter collection chamber when a vacuum is generated therein, and so that liquified matter present in the hose flows back into the source of liquified matter when a vacuum is not generated within the matter collection chamber.

These and other objects of the present invention will become more apparent from the following description of the preferred embodiment.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
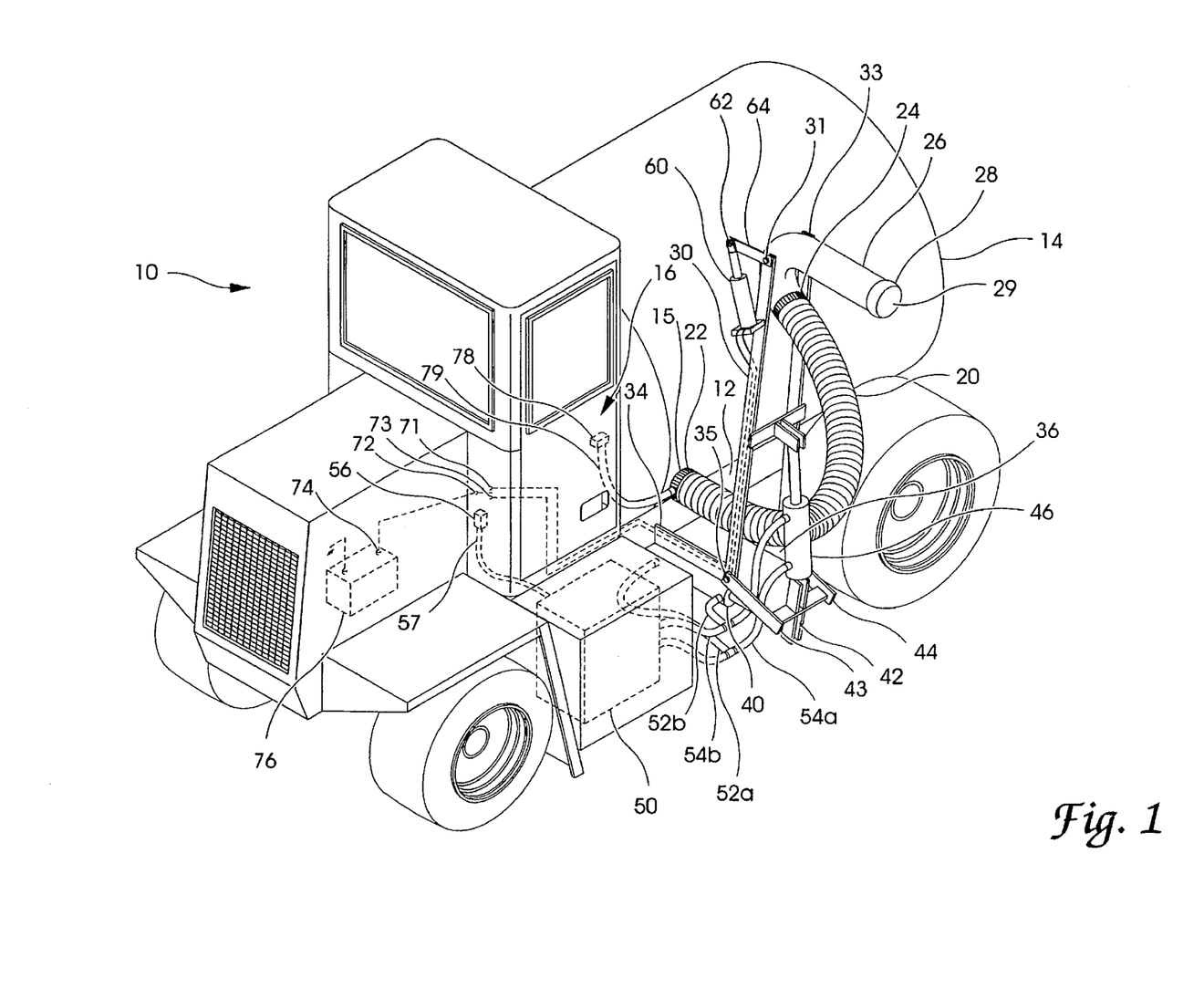
FIG. 1 is a right front perspective view of a vacuum vehicle having a remotely controllable vacuum hose connected thereto in accordance with the present invention.
Figure 3:
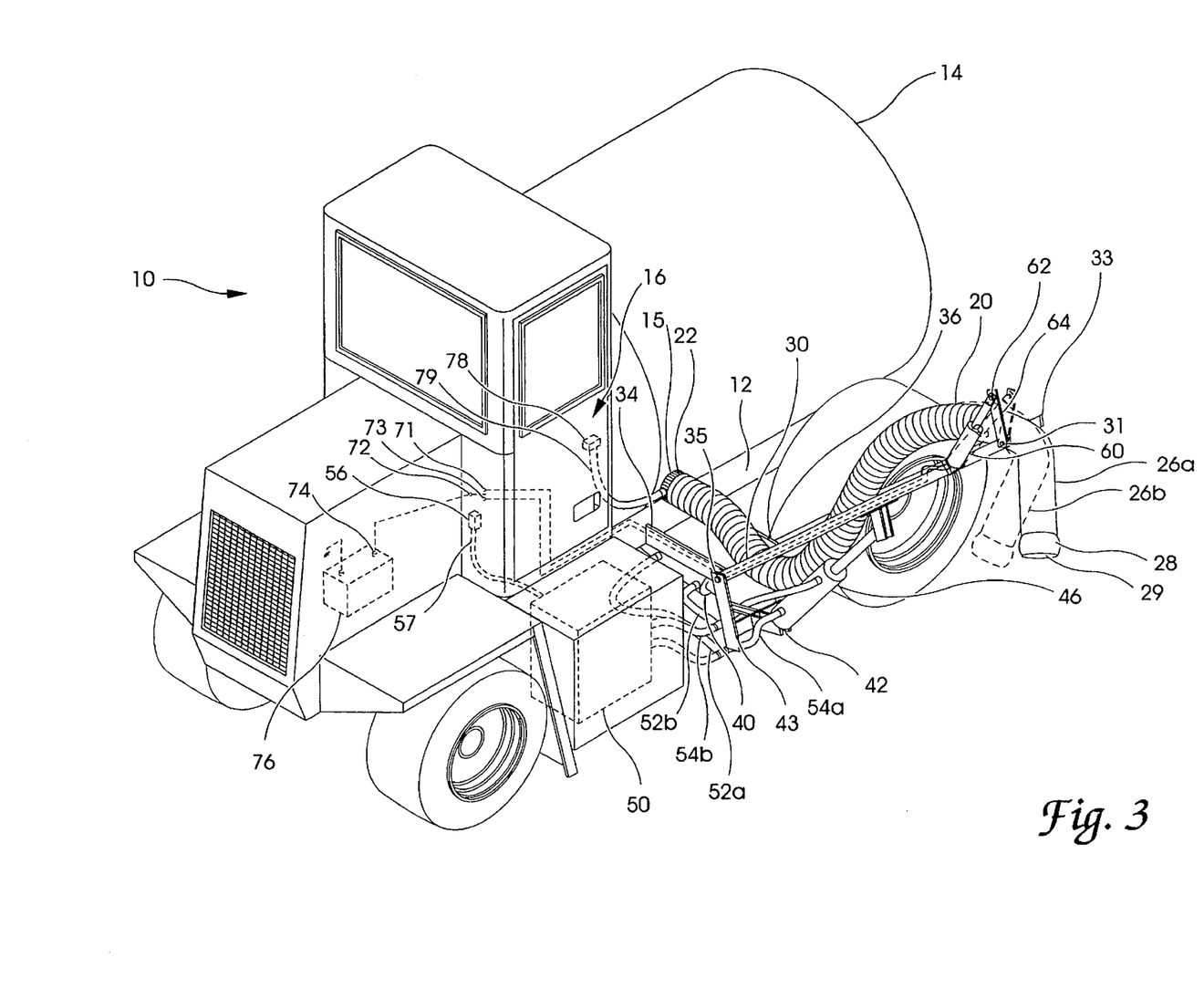
FIG. 3 is a right front perspective view of the apparatus shown in FIG. 1 with the vacuum hose shown in various articulatable positions.

Referring now to FIGS. 1 and 3, a vacuum vehicle 10 having a vacuum hose 20 operatively connected thereto, in accordance with one aspect of the present invention, is shown. The vacuum vehicle includes a frame 12 for supporting a collection chamber 14 in which a vacuum may be selectively generated according to known techniques. The vehicle 10 further includes a cab area 16 containing various operator controls as is common in the motor vehicle industry. Preferably, the vacuum vehicle 10 is a known vacuum truck or similar vehicle, but the present invention contemplates that the vacuum vehicle may include a vacuum wagon, trailer or like apparatus pulled by a tractor, truck or similar vehicle.

In accordance with the present invention, a hose 20 has a first end 22 connected to a port 15 of the collection chamber 14 of the vacuum vehicle 10. Port 15 has a hydraulic valve associated therewith (not shown) which may be opened by the vehicle operator to permit a vacuum to be established within hose 20, and may be closed to isolate the hose 20 from vacuum and to keep collected matter within the chamber 14. A vacuum bleed hose 79 is connected at one end to hose 20, adjacent port 15, and at an opposite end to a valve 78, preferably located within the cab area 16 of the vacuum vehicle 16, the operation of which will be described hereinafter. Alternatively, valve 78 may be positioned at various locations on the vacuum truck 10 without detracting from the spirit of the invention. The cab 16 is the preferred location of valve 78 so that the vehicle operator will not have to leave the comfort of the cab 16 in order to actuate the valve 78.

Hose 20 has a second end 24 which is operatively connected to an arcuate shaped hollow probe 26. Preferably, hose 20 is flexible and is constructed of rubber. However, the present invention contemplates applications of the inventive concepts described herein which may require hose 20 to be constructed of a flexible but non-degradable, or possibly food-grade, elastomer, plastic, nylon, resin-based or similar synthetic material. Probe 26 is intended to be substantially rigid and is preferably constructed of sheet metal but may similarly be constructed of a rigid plastic, nylon or similar material as well as other types of metals.

Probe 26, and consequently hose 20, is pivotably connected to the frame 12 of the vacuum vehicle 10. A pair of parallel supports 30 and 32 are pivotably connected at one end to opposite sides of probe 26 at pivot locations 31 and 33 respectively. The opposite ends of parallel supports 30 and 32 are pivotably connected to one end of horizontal parallel supports 34 and 36 respectively, at pivot locations 35 and 37 (FIG. 4) respectively. The opposite ends of horizontal parallel supports 34 and 36 are rigidly connected to the frame 12 of the vacuum vehicle 10. A support structure 42 is pivotably connected to parallel support 30 and horizontal parallel support 34 at pivot location 35. Similarly, support structure 42 is pivotably connected to parallel support 32 and horizontal parallel support 36 a pivot location 37. Finally, a support structure 48 is rigidly connected to each of the parallel supports 30 and 32 at approximately their midpoints.

A first pivot actuator 40 is connected between the vehicle frame 12 and support structure 42, and a second pivot actuator 46 is connected between support structure 42 and support structure 48. Together, pivot actuators 40 and 46 are operable to pivot parallel supports 30 and 32 with respect to horizontal parallel supports 34 and 36 respectively, between a raised position, as shown in FIG. 1, to a lowered position, as shown in FIG. 3. Preferably, pivot actuators 40 and 46 are hydraulic extension/retraction actuators, although the present invention contemplates using mechanical, electromechanical, pneumatic or like actuators as pivot actuators 40 and 46.

Hydraulic pivot actuator 46 is connected to a hydraulic supply source 50 via fluid lines 54a and 54b. Hydraulic pivot actuator 40 is connected to fluid lines 54a and 54b via fluid lines 52a and 52b, respectively. Hydraulic supply source 50 is further connected to a hydraulic activation switch 56, preferably located within the cab 16 of the vehicle 10, by activation line 57. Alternatively, hydraulic activation switch 56 may be positioned at various locations on the vacuum truck 10 without detracting from the spirit of the present invention. The cab 16 is the preferred location of switch 56 so that the vehicle operator will not have to leave the comfort of the cab 16 in order to actuate the hydraulic actuators 40 and 46. Hydraulic supply source 50 is controllable via switch 56 to either simultaneously extend or retract pivot actuators 40 and 46 respectively as is commonly known in the hydraulics industry.

A third pivot actuator 60 is affixed at one end to parallel support 30. The opposite end of pivot actuator 60 is pivotably connected, at pivot location 62, to one end of pivot bar 64. The opposite end of pivot bar 64 is pivotably connected to pivot location 31. Pivot actuator 60 may be selectively actuated to pivot probe 26 in a direction transverse to the longitudinal axis of the vehicle 10 between an extended position 26a and a retracted position 26b, as shown in FIG. 3. In the present application, pivot actuator 60 is not required to extend and retract probe 26 to the extent required by actuators 40 and 46. For this reason, pivot actuator 60 is preferably an electrically controllable hydraulic extension/ retraction actuator, although the present invention contemplates using mechanical, electro-mechanical, pneumatic or like actuator as pivot actuator 60. The present invention further contemplates applications requiring a greater range of pivot motion for probe 26, thereby requiring pivot actuator 60 to be a hydraulic actuator, similar to actuators 40 and 46, which is operatively connected to hydraulic supply source 50.

Electrically controllable hydraulic pivot actuator 60 is connected to separate poles 71 and 73 of an electrical switch 70. A third pole 72 is connected to a source of electrical power, such as to one terminal 74 of a vehicle battery 76. Alternatively, terminal 72 of switch 70 is connected to the vehicle's power system such that power is supplied to terminal 72 only when the vehicle is operating. As is commonly known with electrically controllable hydraulic actuators, switching power to terminal 71 causes the actuator to extend, while switching power to the other terminal 73 causes the actuator to retract, thereby providing control over the pivoting of probe 26. As with switch 56, switch 70 is preferably located within the cab 16 of the vehicle 10. Alternatively, switch 70 may be positioned at various locations on the vacuum truck 10 without detracting from the spirit of the present invention. Again, the cab 16 is the preferred location of switch 70 so that the vehicle operator will not have to leave the comfort of the cab 16 in order to actuate the hydraulic actuator 60. It is to be understood, however, that in cases where the vacuum vehicle 10 has no cab 16 as with, for example, a tractor, switches 56 and 70, and valve 78, may be conveniently located in the operator area of such a vehicle so as to be within easy reach of the vehicle operator.

Figure 2:
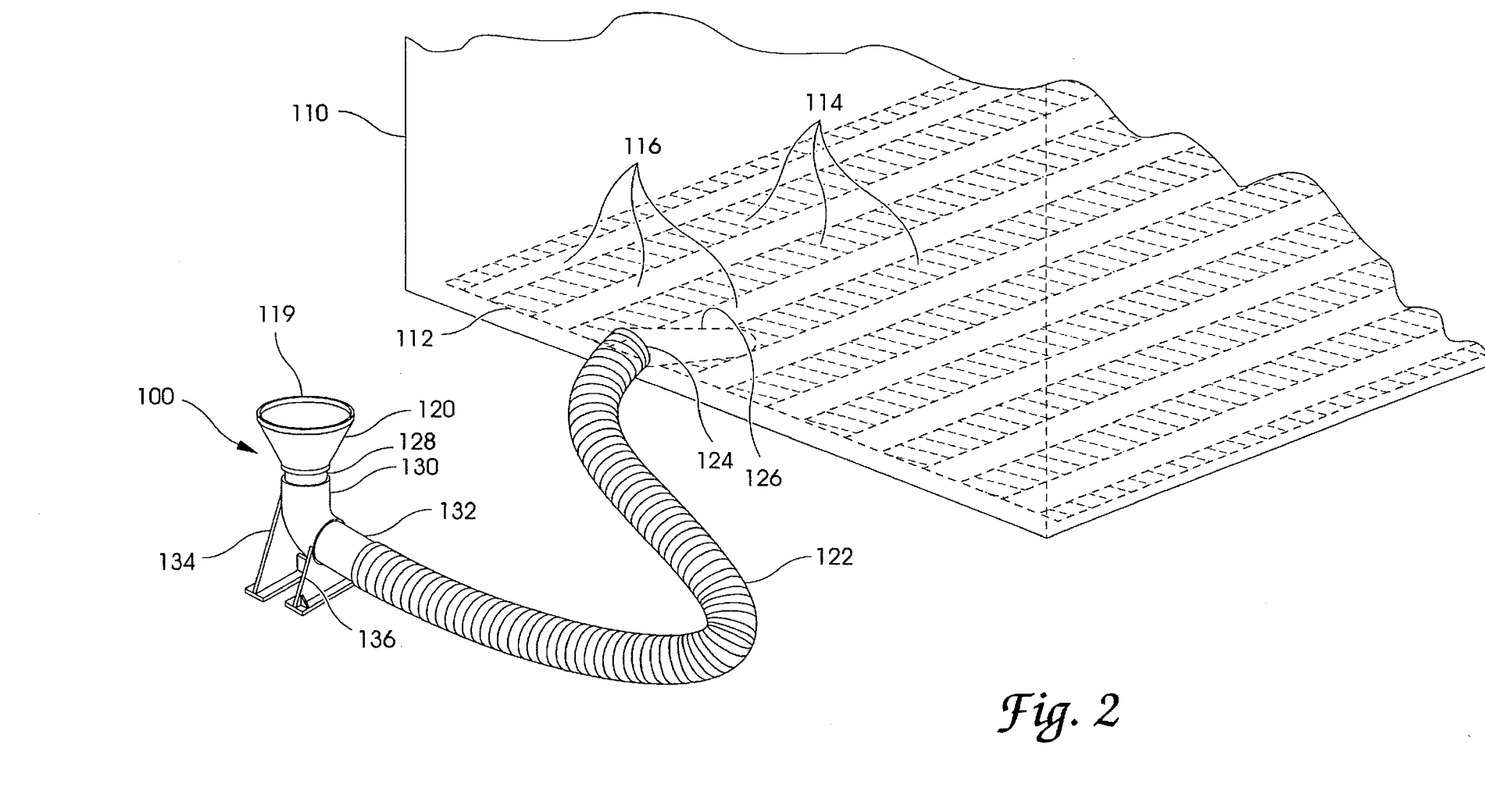
FIG. 2 is a diagrammatic illustration of a liquified matter extraction port operatively connected to a source of liquified matter.

Referring now to FIG. 2, an extraction port 100 is shown connected to a source of liquified matter 114, in accordance with another aspect of the present invention. In a preferred embodiment, the source of liquified matter 114 is an animal confinement building 110 having a floor made of slats 116 so that animal excrement may drop through gaps therebetween into a manure pit 112 located therebeneath. Alternatively, the floor may have a mesh or similar structure, an important feature of the floor being that it allows animal excrement to pass therethrough to the manure pit 112. Thus, the liquified matter is, in a preferred embodiment, liquified manure. It is to be understood that animal excrement within the manure pit 112 may be further broken down to any desired consistency by known methods such as by adding fluid and/or chemicals thereto.

The extraction port 100 includes a funnel operatively connected to one end of a hose 122. Preferably, hose 122 is constructed of the same material as hose 20. The opposite end 124 of hose 122 is connected to the confinement building 110. Inside the confinement building 110, a hose extension 126 has one end connected to the end 124 of hose 122, and an opposite end extending into the manure pit 112.

With respect to the detail of the extraction port 100, the funnel 120 has a wide opening 119 at one end for receiving probe 26 therein, as will be more fully discussed hereinafter, and a cylindrical opposite end 121 connected to one end of a hollow extension tube 128. The opposite end of tube 128 is connected to one end of a hollow elbow 130 which has an opposite end connected to one end of another hollow tube 132. The opposite end of tube 132 is connected to hose 122.

Elbow 130 is connected, adjacent tube 128, to a first vertical support member 134. Similarly, elbow 130 is connected, adjacent tube 132, to a second vertical support member 136. Vertical support members 134 and 136 are configured to maintain the open end 119 of the funnel 120 directed upwardly for receiving the probe 26 therein.

Although manure pit 112 is shown in FIG. 2 as being located beneath an animal confinement building 110, it is to be understood that pit 112 may be any manure confinement structure such as a manure storage pit or lagoon. An important aspect of the design of the extraction port 100 is that it is positioned above the manure pit 112 to maintain the liquified manure 114 within the manure pit 112 under the action of gravity. Thus, without detracting from the intended scope of the present invention, manure pit 112 may alternatively be any manure confinement location as long as provisions are made to maintain extraction port 100 elevationally above the liquid manure 114.

Figure 4:
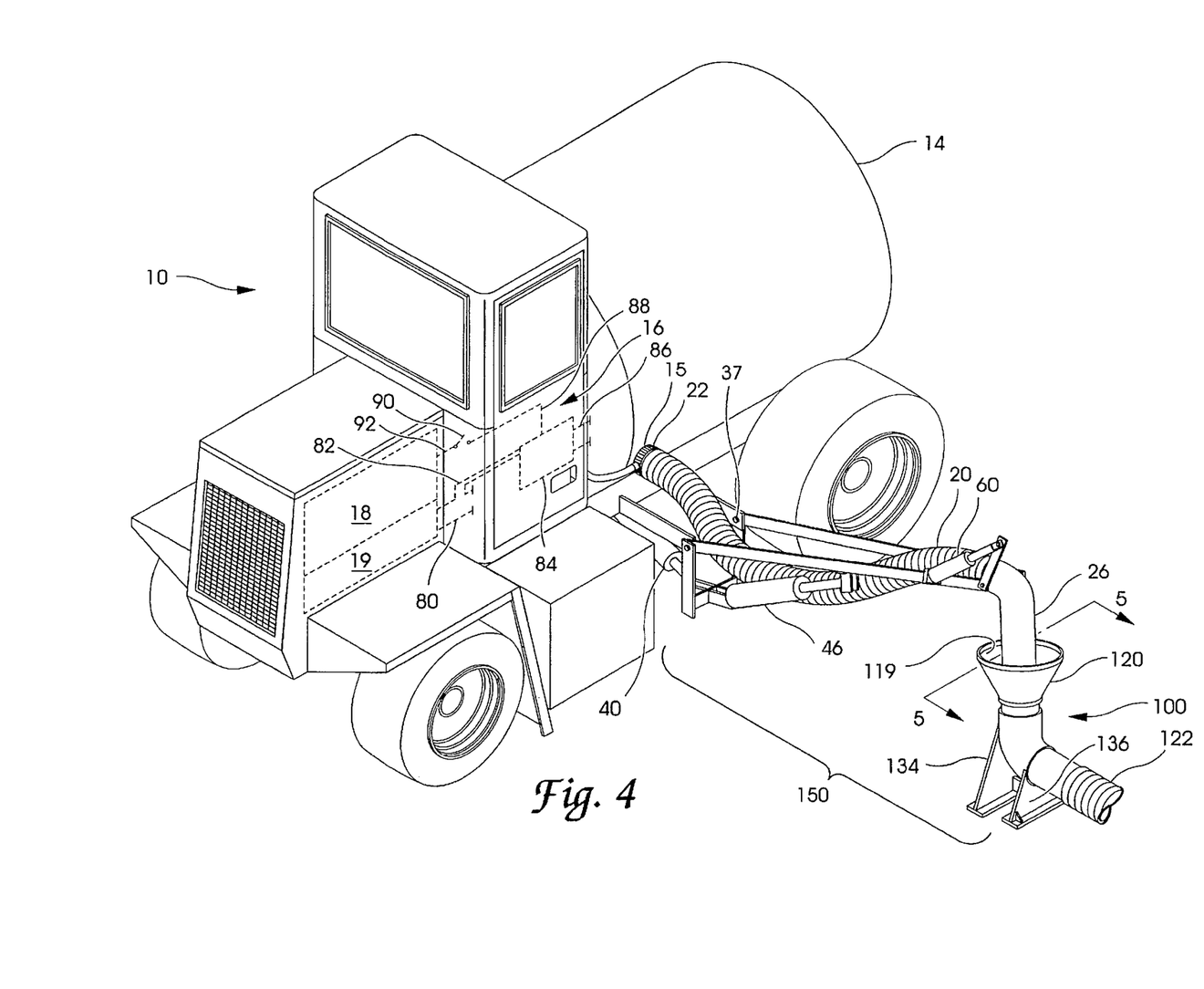
FIG. 4 is a right front perspective view of the apparatus shown in FIGS. 1–3 with the vacuum hose operatively engaged with the extraction port.

Referring now to FIG. 4, the liquified matter collection apparatus 150 of the present invention is shown. For clarity of illustration, the hydraulic and electrical connections to hydraulic pivot actuators 40, 46 and 60 have been omitted, along with the vacuum bleed connection to hose 20. It is to be understood, however, that such connections are required for operation of the apparatus 150 and reference will be made to FIGS. 1 and 3 in describing their functions.

With respect to the vacuum vehicle 10, an engine 18 and transmission 19 are further included therein and are operable as is commonly known in the motor vehicle industry. The transmission typically includes a drive line 80 extending therefrom to rotate the wheels 81 of the vehicle. In a vacuum vehicle such as vehicle 10, it is known to tap into the drive line, or power take off mechanism, with a linkage 82 connected to a vacuum pump 84. The pump 84 is operatively connected to an input port 86 of the matter collection chamber 14. A switch 90, typically located in the cab area 16, is connected, via line 92, to the electrical system of the engine, and via line 88 to the pump 84. As is commonly known in the vacuum vehicle industry, switch 90 may be selectively activated to thereby selectively generate a vacuum within the matter collection chamber 14. With the liquified matter collection apparatus 150 operatively connected to the vacuum vehicle, the vacuum selectively generated within the matter collection chamber 14 is established at the inlet 29 of the probe 26.

In a preferred embodiment, the vacuum vehicle 10 is a liquified manure collection vehicle. Vehicle 10 may be used to transport manure to a remote storage location, or may include means for spreading, injecting, or otherwise distributing the liquified manure in a field or other suitable location as fertilizer.

In operation, the liquified manure collection vehicle operator pulls alongside the extraction port 100 in preparation to extract liquified manure from the manure pit 112 (not shown in FIG. 4). By operating the vehicle in forward and reverse directions, the operator may properly position the hose 20 and probe 26 combination, with respect to the forward and reverse directions, for receipt within the funnel opening 119. Switches 56 and 70 may then be selectively activated, as previously discussed, to position the probe 26 within the funnel 120.

Figure 5:
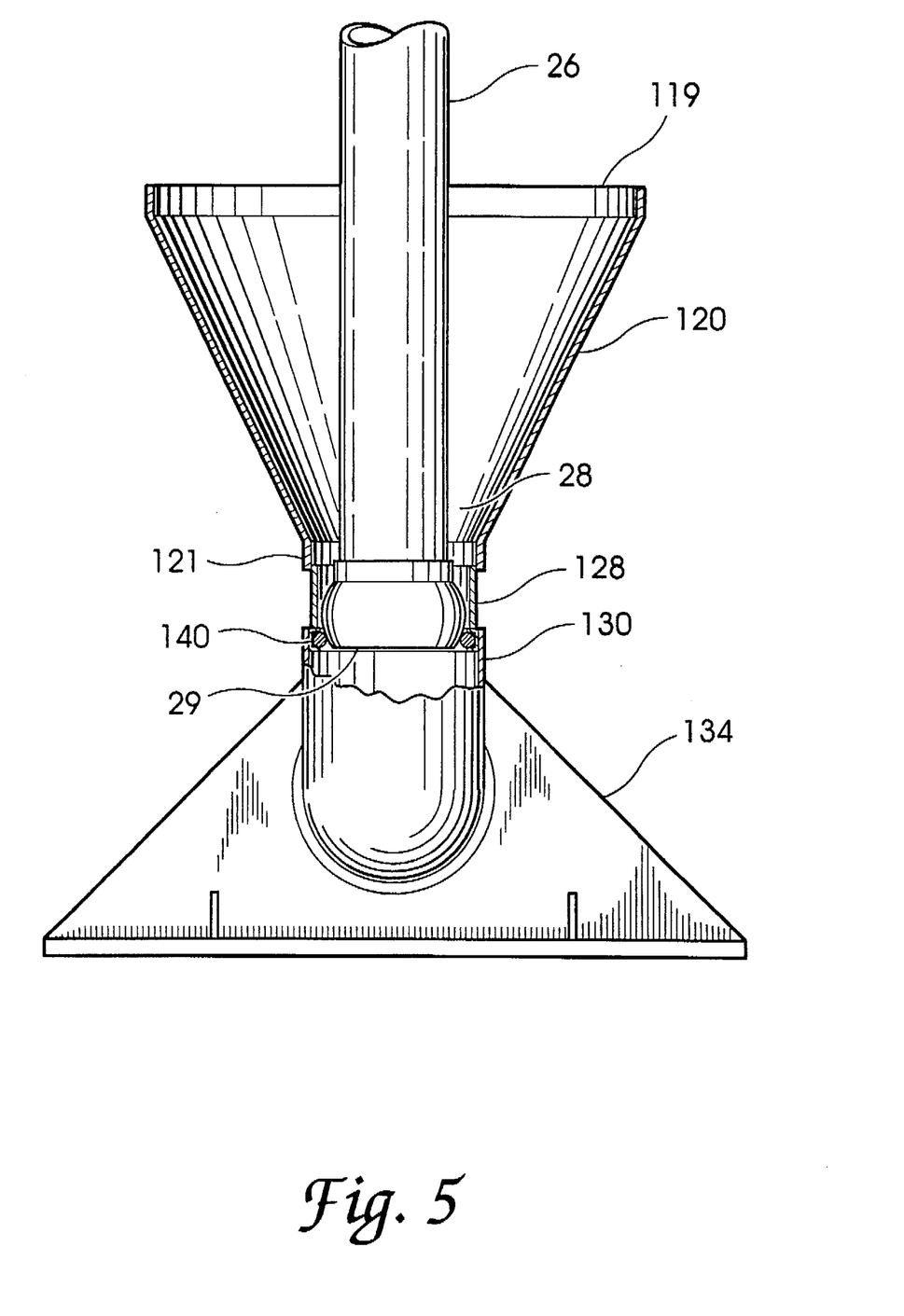
FIG. 5 is a partial cross-sectional view of the vacuum hose to extraction port engagement taken along the section lines 5—5 of FIG. 4.

Referring now to FIG. 5, the end 28 of probe 26 is bulb-shaped to permit sealing engagement with the extraction port 100. As the operator guides the end 29 of the probe 26 into the interior of the funnel 120, bulbed surface 28 is forced against an annular ring 140 positioned about the interior surface of tube 128 to form a seal therebetween. Annular ring 140 is preferably made of rubber, but may alternatively be constructed of an elastomer, plastic, nylon, resin-based or other flexible material. An important advantage of providing such an annular ring, or O-ring, 140 within tube 28 is that probe 26 need not be necessarily axially aligned with tube 28 in order to form a seal therebetween. In other words, a seal may be formed between bulb-shaped portion 28 and O-ring 140 even when probe 26 is axially misaligned with tube 28. In any event, a seal is established between bulb-shaped end 28 of probe 26 and O-ring 140 by downward hydraulic pressure on probe 26. Such downward hydraulic pressure is supplied by hydraulic activators 40, 46, and 60 under guidance of the vehicle operator.

When such a seal is achieved, the vehicle operator may activate the vacuum pump 84 to create suction sufficient to cause liquified manure 114 to flow from the manure pit 112, through hose 122, through hose 20 and into the liquified manure collection chamber 14 of the vacuum vehicle 10. Alternatively, the vehicle operator may activate the vacuum pump prior to sealingly engaging the probe end 28 with the O-ring 140. The latter mode of operation provides the operator with instant feedback as to whether a proper seal has been established between the probe end 28 and O-ring 140 since the operator will, in most cases, be able to hear or feel the flow of liquified manure through the system when a proper seal has been established. Such an arrangement provides a distinct advantage over the prior art in that the vehicle operator need not leave the comfort of the cab area 16 in order to transfer a load of liquified manure from the manure pit 112 to the liquified manure collection chamber 14 of the vacuum vehicle.

With either mode of operation, the vacuum pump 84 is activated until either the liquified manure collection chamber 14 is full, or a desired amount of liquified manure has been transferred to chamber 14. In either case, after time operator deactivates the vacuum pump 84, the valve 78 may be activated to bleed off vacuum within hose 20 and let outside air therein. Bleeding vacuum from hose 20 has the dual effect of breaking the vacuum seal between the bulb-shaped end 28 of the probe 26 and the O-ring 140, and also permitting excess liquified manure contained within the hose 20 and/or probe 26 to drain, under the action of gravity, back into the funnel 120 and hose 122. Due to the elevational positioning of the extraction port 100, the excess manure drains back into the manure pit 112. This feature greatly reduces spillage and mess around and about the manure transfer site.

It has been determined, through experimentation, that using the liquified manure collection apparatus 150 in cooperation with a vacuum vehicle 10 results in approximately a 30% increase in manure transfer time over conventional methods of manure transfer. With such semi-automation, the apparatus 150 of the present invention will find application in many other matter transfer arrangements. In fact, the present invention contemplates that the matter collection apparatus 150 may be used to collect any vacuum-transportable matter within a vacuum-transportable matter collection chamber of a vacuum vehicle. For example, dry vacuum-transportable matter may include salt for municipal salt trucks, dry fertilizer for distribution by motor vehicle or aircraft, grain from grain bins, loose insulation from a storage bin, and bulk foam for use in the bedding and furniture industry. Similarly, vacuum-transportable matter may include slurry or sludge matter such as liquified sludge from pulp mills, liquified industrial waste, food products and hospital waste, for example. Finally, the present invention may be used to transfer purely liquid matter such as salt water for use by municipal street vehicles, paint for use by line-painting road crews and the like, liquid fertilizer for distribution by motor vehicles or aircraft, water or other liquid for use by aircraft to fight forest fires, insecticide for use by either motor vehicles or aircraft, and fuel for use by any vehicle requiring liquid fuel.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An apparatus for extracting liquified matter from a source of liquified matter comprising:

an extraction chamber positioned remote from a source of liquified matter and fluidly connected thereto via a conduit;

a hose having a first end connected to a liquified matter collection container and a second end sealingly engageable within said extraction chamber; and means remote from said second end of said hose for automatically guiding said second end thereof into sealing engagement within said extraction chamber;

wherein liquified matter flows from the source of liquified matter to said collection container when said second end of said hose is sealingly engaged within said extraction chamber.

2. The apparatus of claim 1 wherein said extraction port includes a funnel adapted to receive said second end of said hose therein.

3. The apparatus of claim 2 wherein said means for guiding said second end of said hose includes means for hydraulically guiding said second end of said hose for receipt within said funnel.

4. The apparatus of claim 3 wherein said second end of said hose includes a hollow probe connected thereto.

5. The apparatus of claim 4 wherein said means for hydraulically guiding said second end of said hose includes means for articulating said probe for receipt within said funnel.

6. The apparatus of claim 4 wherein said means for articulating said probe includes an electrically controllable hydraulic actuator.

7. The apparatus of claim 4 wherein said funnel includes a flexible annular ring positioned therein, and wherein said hollow probe is configured to sealingly receive said annular ring thereabout when said probe is received within said funnel to thereby sealingly engage said probe with said funnel.

8. An apparatus for transferring matter from a source of vacuum-transportable matter to a matter collection chamber of a vehicle, said matter collection chamber having means associated therewith for selectively generating a vacuum therein, the apparatus comprising:

a vacuum hose having a first end connected to a matter collection chamber of a vehicle and a second end;

an extraction chamber adapted to be positioned remote from a source of vacuum-transportable matter via a conduit and connected in fluid communication therewith, said extraction chamber adapted to form a vacuum seal with said second end of said vacuum hose within said extraction chamber, wherein vacuum generated in the matter collection chamber is thereby operable to draw vacuum-transportable matter through said vacuum hose and into the matter collection chamber; and means remote from said second end of said vacuum hose for automatically guiding said second end of said vacuum hose into sealing engagement within said extraction chamber;

wherein vacuum-transportable matter within said hose and said extraction chamber flows back into the source of vacuum-transportable matter when the vacuum is not generated within the matter collection chamber.

9. The apparatus of claim 8 wherein the vehicle is operable in a forward and reverse direction;

and wherein said second end of said vacuum hose is guidable in directions parallel with the vehicle via operation of the vehicle in the forward and reverse directions.

10. The apparatus of claim 9 wherein said means for guiding said second end of said vacuum hose is operable to guide said second end in directions transverse with the vehicle direction.

11. The apparatus of claim 8 further including means for actuating said means for guiding said second end of said vacuum hose.

12. The apparatus of claim 11 wherein the vehicle includes a cab area for operating the vehicle;

and wherein said means for actuating said means for guiding said second end of said vacuum hose is located within the cab area.

13. The apparatus of claim 8 wherein said extraction port is a funnel.

* * * * *